(12) United States Patent
Ankermann et al.

(10) Patent No.: US 11,281,196 B2
(45) Date of Patent: Mar. 22, 2022

(54) INTEGRATED PLANNING OF PRODUCTION AND/OR MAINTENANCE PLANS

(71) Applicants: Primetals Technologies Austria GmbH, Linz (AT); Primetals Technologies Germany GmbH, Erlangen (DE)

(72) Inventors: Kai Ankermann, Neunkirchen a.B. (DE); Arno Haschke, Erlangen (DE); Kurt Herzog, Wilhering (AT); Gerhard Kurka, Hofkirchen im Traunkreis (AT); Michael Weinzinger, Neuhofen a. d. Krems (AT); Günther Winter, Neunkirchen/Brand (DE)

(73) Assignees: PRIMETALS TECHNOLOGIES AUSTRIA GMBH; PRIMETALS TECHNOLOGIES GERMANY GMBH

( * ) Notice: Subject to any disclaimer, the term of this patent is extended or adjusted under 35 U.S.C. 154(b) by 47 days.

(21) Appl. No.: 16/484,273

(22) PCT Filed: Jan. 30, 2018

(86) PCT No.: PCT/EP2018/052226
§ 371 (c)(1),
(2) Date: Aug. 7, 2019

(87) PCT Pub. No.: WO2018/145947
PCT Pub. Date: Aug. 16, 2018

(65) Prior Publication Data
US 2020/0004230 A1    Jan. 2, 2020

(30) Foreign Application Priority Data
Feb. 7, 2017  (EP) .................................... 17154920

(51) Int. Cl.
*G05B 19/418*  (2006.01)
*G05B 19/042*  (2006.01)
(Continued)

(52) U.S. Cl.
CPC ... *G05B 19/41875* (2013.01); *G05B 19/0425* (2013.01); *G05B 19/41865* (2013.01); *G07C 3/005* (2013.01); *G07C 3/146* (2013.01)

(58) Field of Classification Search
CPC .......... G05B 19/41875; G05B 19/0425; G05B 19/41865; G05B 23/0294;
(Continued)

(56) References Cited

U.S. PATENT DOCUMENTS

| | | | |
|---|---|---|---|
| 5,216,612 A | 6/1993 | Cornett et al. | 364/468 |
| 2013/0304245 A1 | 11/2013 | Lam et al. | 700/109 |

(Continued)

FOREIGN PATENT DOCUMENTS

| | | |
|---|---|---|
| CN | 102591286 A | 7/2012 |
| CN | 106127358 A | 11/2016 |

(Continued)

OTHER PUBLICATIONS

Gerhard Kurka et al., "TPQC—Through-Process Quality Control", 9th China International Steel Congress, China Iron & Steel Association (2016) 8 pages.
(Continued)

*Primary Examiner* — Thomas C Lee
*Assistant Examiner* — Charles Cai
(74) *Attorney, Agent, or Firm* — Ostrolenk Faber LLP (57) ABSTRACT

A production planning system (6) for a raw materials industry plant (ANL), which determines the production planning data (Pi) thereof and specifies said data to the automation system (1) of the plant (ANL). A state monitoring system (7) determines previous and future anticipated (Continued)

states (Z1) of components of the plant (ANL). A quality determination system (8) determines states (Z2) of output products (Ai) produced and still to be produced by the plant (ANL) and/or past and future states (Z3) of the plant (ANL) as a whole. A maintenance planning system (9) and/or the production planning system (6) receive, from the state monitoring system (7), the states (Z1) of the components of the plant (ANL), determined by the state monitoring system (7) and, from the quality determination system (8), the states (Z2 and Z3) of the output products (Ai) and/or of the plant (ANL) as a whole, determined by the quality determination system (8). They consider the data received from the state monitoring system (7) and from the quality determination system (8) in the determination of maintenance planning data (W) and/or the production planning data (Pi).

13 Claims, 2 Drawing Sheets

(51) Int. Cl.
*G07C 3/00* (2006.01)
*G07C 3/14* (2006.01)

(58) Field of Classification Search
CPC ........... G05B 2219/32111; G05B 2219/32252; G05B 2219/32324; G07C 3/005; G07C 3/146; Y02P 90/02; Y02P 90/80
See application file for complete search history.

(56) References Cited

U.S. PATENT DOCUMENTS

| | | | |
|---|---|---|---|
| 2017/0004429 A1* | 1/2017 | Maenishi | G06Q 10/06312 |
| 2017/0284186 A1* | 10/2017 | Samuel | E21B 49/00 |
| 2018/0150038 A1* | 5/2018 | Lin | G05B 13/048 |
| 2018/0307212 A1* | 10/2018 | Schneider | G06Q 10/20 |
| 2019/0354090 A1* | 11/2019 | Oyama | H05K 13/0882 |

FOREIGN PATENT DOCUMENTS

| | | | | |
|---|---|---|---|---|
| DE | 100 47 381 A1 | 4/2002 | | |
| DE | 10 2007 036 325 A1 | 2/2009 | | |
| DE | 102007036325 A1 * | 2/2009 | ............. | G06Q 10/06 |
| EP | 0 467 257 A2 | 1/1992 | | |
| JP | 2015142084 A | 8/2015 | | |
| WO | WO 2012/025438 A1 | 3/2012 | | |

OTHER PUBLICATIONS

Dr. J. Kempken et al., "All about Quality: Operational Know-how Combined with a New Generation of Product Quality Assessment", $9^{th}$ China International Steel Congress, China Iron & Steel Association (2016) pp. 973-978.
"PSImetals Planning—Production Management Solutions for the Metals Industry", PSI Metals GmbH (2014) (20 pages).
JaeHoon Lee et al., "Development of Computerized Facility Maintenance Management System Based on Reliability Centered Maintenance and Automated Data Gathering", International Journal of Control and Automation, vol. 6, No. 1 (2013) pp. 1-12.
"Achieve greater efficiency in asset management by managing all your asset types on a single platform", IBM Corporation (2007)(8 pages).
"PREDIX—The Industrial Internet Platform", General Electric Company (2016) (27 pages).
Tina Maniura et al., "Time Management at the BOF meltshop 2 of thyssenkrupp Steel in Beeckerwerth", stahl und eisen, Technik + Trends (2016), vol. 136, No. 3, pp. 51-57.
Karen Puttkammer et al., "Integrierte Produktionsplanung—Energie— und Ressourceneffizienz weiter gedacht", Anlagentechnik (2016), vol. 136, No. 5 , pp. 69-73 (with English Translation).
International Search Report dated May 28, 2018 in corresponding PCT International Application No. PCT/EP2018/052226.
Written Opinion dated May 28, 2018 in corresponding PCT International Application No. PCT/EP2018/052226.
Extended European Search Report dated Aug. 10, 2017 in corresponding European Patent Application No. 17154920.7.
English translated Chinese Search Report, dated Sep. 29, 2021, issued in corresponding Chinese Patent Application No. 201880010728. 9. Total 3 pages.

* cited by examiner

INTEGRATED PLANNING OF PRODUCTION AND/OR MAINTENANCE PLANS

CROSS-REFERENCE TO RELATED APPLICATIONS

The present application is a 35 U.S.C. §§ 371 national phase conversion of PCT/EP2018/052226, filed Jan. 30, 2018, the contents of which are incorporated herein by reference which claims priority of European Patent Application No. 17154920.7, filed Feb. 7, 2017, the contents of which are incorporated by reference herein. The PCT International Application was published in the German language.

FIELD OF TECHNOLOGY

The present invention relates to a method for planning production and/or maintenance of raw materials industry plants.

TECHNICAL BACKGROUND

The raw materials industry plant is controlled by an automation system and executes a sequence of production orders under control by the automation system, wherein the raw materials industry plant produces a number of outing products from a number of input products per production order.

The production planning system, with a time horizon of at least several days, determines production planning data, which specifies at which times which input products should be fed to the raw materials industry plant, which output products should be produced by the raw materials industry plant from the input products and at which times the output products should be produced by the raw materials industry plant. The production planning system specifies the production planning data to the automation system.

A state monitoring system receives, from the automation system and/or via sensor devices, directly from the raw materials industry plant measurement data and/or data derived from the measurement data, determines from this the previous states of components of the raw materials industry plant and furthermore, with the additional utilization of the production planning data or data derived from the production planning data, determines future predicted states of the components of the raw materials industry plant.

A quality determination system different from the automation system receives measurement data and/or data derived from the measurement data from the automation system and/or via sensor devices directly from the raw materials industry plant, and from this, the quality system determines the states of the output products produced by the raw materials industry plant.

A maintenance planning system determines maintenance planning data for the raw materials industry plant taking into account predicted states of the components of the raw materials industry plant.

In the system for planning production and/or maintenance of raw materials industry plants, the raw materials industry plant is controlled by an automation system and executes a sequence of production orders under control by the automation system, wherein the raw materials industry plant produces a number of output products from a number of input products per production order. The system comprises a production planning system, a state monitoring system, a quality determination system, which is different from the automation system, and a maintenance planning system.

The production planning system, the state monitoring system, the quality determination system, and the maintenance planning system are programmed in such a manner that they jointly execute such a method for the planning of production and/or maintenance of raw materials industry plants.

PRIOR ART

A method for operating a raw materials industry plant is known from WO 2012/025 438 A1. The plant is a rolling mill. The raw materials industry plant is controlled by an automation system. The plant executes a predefined sequence of production orders controlled by the automation system. Per production order the raw materials industry plant produces a number of output products from a number of input products. A state monitoring system receives measurement data and/or data derived from the measurement data from the automation system and/or via sensor devices directly from the raw materials industry plant. It determines from this the previous states of components of the raw materials industry plant and furthermore with additional utilization of production planning data or data derived from the production planning data future predicted states of the components of the raw materials industry plant. The components of the raw materials industry plant comprise the rollers of rolling stands of the rolling mill. The determined states comprise the wear of the rolling stands. If the wear exceeds a predetermined extent, an alarm message is output to an operator.

It is known from the scientific paper "Development of Computerized Facility Maintenance Management System Based on Reliability Centred Maintenance and Automated Data Gathering" by JaeHoon Lee et al., International Journal of Control and Automation, Vol. 6, No. 1, February, 2013, pages 1 to 12, to couple a state monitoring system and a maintenance planning system together.

Raw materials industry plants, in particular of the metal-producing industry such as metallurgical plants, are frequently assigned a production planning system, usually designated as PPS=production planning system. A production planning system is a processing device to which primary orders are fed. The primary orders comprise technical and logistical order data in each case. The technical order data specify which output product should be produced by the raw materials industry plant in each case. The logistical order data specify the deadline by which the corresponding order must or should be executed. The production planning system determines production planning data by reference to the primary orders. The production planning data specify at which times which input products should be supplied to the raw materials industry plant. This data further specifies which output products should be produced from the input products by the raw materials industry plant. It further specifies at which times the output products should be produced by the raw materials industry plant. The production planning system performs the determination of the production planning data with a relatively large time horizon. The time horizon is usually at least several days, frequently even several weeks or months.

Such production planning systems are known. Purely as an example, reference is made to DE 100 47 381 A1. The scientific reports "Time management at the BOF meltshop 2 of thyssenkrupp Steel in Beeckerwerth", stahl und eisen 136 (2016), Number 3, pages 51 to 57 and "Integrated production planning—energy and resource efficiency further conceived", stahl und eisen 136 (2016), Number 5, pages 69 to 73, should be mentioned in this context. Furthermore, such production planning systems are also available on the market from various manufacturers. For example, such a production planning system is offered by PSI Metals GmbH, Heinrichstrasse 83-85, 40239 Düsseldorf, Germany. Purely as an example, reference can be made to the prospectus "PSImetals Planning—Production Management Solutions for the Metals Industry" of the said company from July 2014.

Furthermore, raw materials industry plants—in particular of the metal-producing industry—are frequently assigned a maintenance planning system, usually designated as CMMS=computerized maintenance monitoring system. A maintenance planning system is a processing device, which determines maintenance planning data for the raw materials industry plant taking into account predicted states of the components of the raw materials industry plant. The maintenance planning data comprise the measures to be performed in detail in order to be able to carry out specific maintenance processes. The maintenance planning system specifies which measures must be taken at which time and which preparations should be made for this.

Such maintenance planning systems are known. Purely as an example, reference is made to the maintenance planning system MAXIMO, which is supplied by the IBM Corporation, Software Group, Route 100, Somers, N.Y. 10589, USA. The system is also designated as Asset Performance Management System. A maintenance planning system is also described in the prospectus "PREDIX—The Industrial Internet Platform" of the General Electric Company from November 2016 (see there in particular page 23).

The raw materials industry plant is furthermore frequently assigned a quality determination system, usually designated as QMS=quality management system, in some cases also designated as TPQC=through process quality control. A quality determination system is also a processing device. The processing device can operate in real time. However, it need not operate in real time. It is a system different from the automation system. The quality determination system receives measurement data and/or data derived from the measurement data from the automation system and/or via sensor devices directly from the raw materials industry plant. This system determines, optionally additionally taking into account the relevant production planning data, the respective state of the output product produced in each case by the raw materials industry plant and assigns this state to the respective output product. For example, in a continuous casting plant as raw materials industry plant, the dimensions, the fluctuations of the dimensions, and the chemical composition are assigned to the respectively cast slab (respective output product). In a rolling mill, the dimensions thereof and the fluctuations of the dimensions can likewise be assigned to a ready-rolled product. Furthermore, parameters describing mechanical properties, for example, the yield stress and so forth, can be assigned to the ready-rolled product.

Such quality determination systems are also known. Purely as an example, reference is made to the scientific report "TPQC—Through Process Quality Control" by Gerhard Kurka and Gerald Hohenbichler, Proceedings of the 9th China International Steel Congress, China Iron & Steel Association, Beijing 2016, pages 1057 to 1064. Another quality determination system is described, for example, in the scientific report "All about Quality: Operational Know-how Combined with a New Generation of Product Quality Assessment" by J. Kempken et al., Proceedings of the 9th China International Steel Congress, China Iron & Steel Association, Beijing 2016, pages 973 to 978.

As a result of the time horizon, production planning is carried out long before the actual execution of the individual production orders. It can therefore only be based on the postulated or predicted availability of the raw materials industry plant and on postulated or predicted states of components of the raw materials industry plant. In practice, however, disturbances occur again and again during operation of the raw materials industry plant. Some of these disturbances are uncritical. Other disturbances have the result that the production planning must be adapted.

If the production planning must be adapted, the adaptation is frequently performed by humans. However, it is also already known to perform an automatic adaptation, see the already-mentioned DE 100 47 381 A1. Also in the case of an automatic adaptation of the production planning, the input of the amended conditions on which the amended planning is then based is however accomplished manually. An automatic or automated allowance for states of components of the raw materials industry plant or of achieved or achievable states of output products is not accomplished in the prior art. Also no automatic or automated allowance for maintenance planning data is accomplished. If any allowance is made at all, manual inputs are required for this. In particular, replannings, which are necessary as a result of unforeseen disturbances of the raw materials industry plant or other unexpected events, are therefore frequently only suboptimal.

The maintenance planning system also operates in a similar way. In particular, the planning of the maintenance is based on empirical values and estimates, which are not compared with actual states of components of the raw materials industry plant or of achieved or achievable states of output products or are tracked and updated with reference to such states. Also no automatic or automated comparison is made with the production planning data. If any allowance is made at all, manual inputs are required for this. Here also the result of the maintenance planning is frequently only suboptimal.

Information relating to the actual state of components of the raw materials industry plant is available in the state monitoring system (CMS=condition monitoring system). The state monitoring system in the prior art monitors the components of the raw materials industry plant. If specific predefined limiting values are reached or exceeded, an alarm is triggered. The limiting values at which an alarm is triggered are fixedly specified to the state monitoring system in the prior art. A relaying of data provided in the state monitoring system to the production planning system is not provided.

Information relating to the actual state of the raw materials industry plant as a whole (that is the process state) and relating to the states of output products produced by means of the raw materials industry plant (and in some cases also of intermediate products) can be provided in the quality determination system. However, the quality determination system is usually not or at least not completely coupled to the maintenance planning system, the production planning system, and the state monitoring system. Any coupling is accomplished in the prior art by manual inputs of the operator.

The manual inputs by the operator require great experience. Nevertheless, the results are frequently not optimal, in particular because such replannings must frequently be carried out under considerable time pressure. A planning on the basis of empirical values is also not optimal, since on the one hand it is necessary to work with certain safety margins and on the other hand current states of the raw materials industry plant cannot be taken into account.

Known from DE 10 2007 036 325 A1 are a method and a system for creating a production plan for a production plant, which comprises a plurality of production components, wherein at least one input variable comprising details about the type and quantity of the products to be produced and/or the type and condition of the respective production plant and/or at least one of its production components, and at least one quantified state of at least one production component are recorded and processed, and from this a state-related optimized production plan is created.

Known from EP 0 467 257 A2 is an integrated maintenance method for a group of machines, which produce a product. A maintenance planning system comprises parts lists, which comprise hierarchical lists for all parts of the production machines of subunits down to individual parts. The maintenance system comprises a maintenance plan and a parts administration system and a spare parts inventory. The maintenance planning system has knowledge of a production plan and of group maintenances in order to minimize lost production time for each complex.

Known from US 2013/0 304 245 A1 is a method for improving the product quality of a production line, wherein the production line comprises several production steps. At least some of the production steps use individual tools multiple times, which are used in individual cases as required. Quality measures are determined for the resulting product lots. Furthermore, those product lots which satisfy the quality measure are determined. It is determined which tools were used for the production of these production lots. Further production lots are created, wherein at least substantially these tools are used.

SUMMARY OF THE INVENTION

The object of the present invention consists in providing possibilities by means of which an optimal production planning and/or an optimal maintenance planning are possible.

The object is achieved by a method for planning production and/or maintenance of raw materials industry plants as disclosed herein.

According to the invention, a method for planning production and/or maintenance of raw materials industry plants of the type mentioned initially is disclosed.

A state monitoring system determines the future predicted states of the components of the raw materials industry plant by using the production planning data or from data derived from the production planning data. So what is used to predict the states is not a typical use of the plant but exactly the planned use of the plant.

The quality determination system is not disclosed in the prior art. The quality determination system determines the states of output products to be produced or the future states of the raw materials industry plant as a whole by using also the future states of the raw materials industry plant as a whole.

The maintenance planning system receives from the state monitoring system not only the previous states of the components but also the states of the components expected in the future. It also receives from the quality determination system the states of the output products to be produced (that is of output products not yet produced at the time of receiving the information) and uses the information from these sources when it determines the maintenance planning data.

The quality determination system receives the previous and the future predicted states of the components of the raw materials industry plant from the state monitoring system and receives the production planning data from the production planning system or from the automation system. That system takes into account the previous states of the components of the raw materials industry plant and the relevant production planning data when determining the states of the output products produced by the raw materials industry plant. The system further determines from the transmitted data the states of the output products to be produced by the raw materials industry plant and/or determines past and future states of the raw materials industry plant as a whole.

A maintenance planning system receives the previous and the future predicted states of the components of the raw materials industry plant from the state monitoring system and, from the quality determination system, receives the states of the output products produced by the raw materials industry plant and of the output products to be produced and/or past and future states of the raw materials industry plant as a whole. Taking into account these data determines the maintenance planning data for the raw materials industry plant and/or the production planning system receives the previous and the future predicted states of the components of the raw materials industry plant from the state monitoring system and, from the quality determination system, receives the states of the output products produced by the raw materials industry plant and the output products to be produced and/or past and future states of the raw materials industry plant as a whole and takes this into account when determining the production planning data.

The raw materials industry plant can, for example, comprise a steel industry plant or a plant of the metal-producing industry. Examples of such plants are a plant for iron production, for example, a blast furnace or a direct reduction plant. Further plants are, for example, downstream facilities in which steel is produced from crude iron. Examples of such plants are electric arc furnaces, a converter, and plants in which ladle processes take place, for example, a vacuum treatment plant. Further plants are facilities downstream of steel production, in which a casting of the metal and a shaping of the cast metal take place. Examples of such plants are a continuous casting plant and rolling mills. The rolling mills can, for example, comprise a rolling mill for rolling a flat rolled material, for example, a blooming train, a finishing train, a Steckel rolling mill, and many others. Furthermore, the rolling mills can comprise a rolling mill for rolling a different cross-section, for example, a billet cross-section. The rolling mill can alternatively comprise a rolling mill for the hot rolling of metal, a rolling mill for the cold rolling of metal, or a combined rolling mill, in which the metal is initially hot- and then cold-rolled. A cooling zone, optionally combined with a rolling mill, can be considered to be a steel producing plant. Other installations upstream or downstream of a rolling mill also may be used, for example, an annealing or a pickling plant.

Raw materials industry plants usually have a process automation. The process automation usually comprises several levels. Level 0 is formed by the sensors and the actuators. Level 1 is the so-called base automation, which implements the control circuits. Level 2 contains the technological automation, which comprises the process models and determines the target values for the control circuits of Level 1. The automation system of the present invention comprises Levels 0, 1, and 2.

The production planning data can be specified directly to the automation system. Alternatively, an indirect specification can be made via a manufacturing execution system (=MES). An MES is a production control system. An MES can include internally as modules a CMMS, a PPS, and/or a QMS. Manufacturing execution systems are generally known to persons skilled in the art. Purely as an example, reference is made to the brochure "Manufacturing Execution Systems—branch-specific requirements and manufacturer-neutral description of solutions", published by the Zentralverband Elektrotechnik- and Elektronikindustrie e.V. (ZVEI), ISBN 978-3-00-031362-2. This brochure contains an overview of MES and also a listing of various suppliers, who supply MES. In particular, PSI Metals GmbH also supplies automatically operating MES for raw materials industry plants. Purely as an example, reference can be made to the prospectus "PSI-metals—Production Management Solutions for Metals Industries" of the said company from March 2015. The MES is there designated as Production Management Solution (PMS).

In a preferred embodiment of the present invention, the maintenance planning system receives the production planning data from the production planning system and takes into account the production planning data when determining the maintenance planning data and/or the production planning system receives the maintenance planning data from the maintenance planning system and takes into account the maintenance planning data when determining the production planning data. Therefore, an at least one-sided coordination of production planning system and maintenance planning system is accomplished, preferably even a mutual coordination. As a result, an even further optimization can be accomplished. For example, maintenances can be specifically placed in time intervals for which a plant standstill is provided in any case as a result of the production planning. Alternatively or additionally, for example production orders for which a particularly high quality level is required can be placed at time points immediately after maintenance measures, when still new unworn plant components are therefore available. Conversely, production orders for which no particularly high quality level is required can naturally also be placed at time intervals long after the last maintenance measures.

A further preferred embodiment provides that the quality determination system take into account the production planning data and/or the future predicted states of the components of the raw materials industry plant determines limiting values for dynamic settings and/or limiting values for resulting states of the components of the raw materials industry plant and that the quality determination system specifies the limiting values for the dynamic settings to the automation system and/or the limiting values for the resulting states to the state monitoring system as limiting values to be maintained. As a result, for example, the limiting values, which are monitored for maintenance by the state monitoring system (for example, the permissible wear), can be adapted dynamically according to the output product to be produced. The same applies to the limiting values for the dynamic settings of the components of the raw materials industry plant, for example, in the case of a rolling mill for rolling metal strip for maximum rolling forces, maximum bend back forces, and many others.

The dynamic determination of the limiting values for dynamic settings and/or of the limiting values for resulting states of the components of the raw materials industry plant can be further optimized whereby the maintenance planning system transmits the maintenance planning data to the quality determination system and the quality determination system also takes into account the maintenance planning data when determining the limiting values. For example, when specific settings of a specific component of the raw materials industry plant cause a relatively high wear, this can be accepted if a maintenance measure is provided soon. If, on the other hand, the maintenance measure is only provided at a later time, it can be advisable to protect the component more.

Usually, the raw materials industry plant is operated for a maximum of a few hours during a respective time interval in the course of the manufacture of a respective output product. A cycle of an electric arc furnace, for example, lasts around 1 hour. Similarly a maximum time interval of 2 to 3 hours is required for heating and rolling a respective slab in a rolling mill. For a single iteration, the production planning system and the maintenance planning system frequently only require a time interval which lies in this range. Preferably, the method for the planning of production and/or maintenance of raw materials industry plants according to the invention is therefore executed in an automated iterative manner. It is thereby possible to execute the method according to the invention for planning production and/or maintenance as it were in real time. The term "real time" is in this case related to the time constants of the raw materials industry plant, not to a time interval in the millisecond range with which the raw materials industry plant is controlled by its automation system.

It is possible that the method for the planning of production and/or maintenance is executed continuously. Alternatively it is possible that the method is executed upon request by a person ("at the press of a button").

It is possible to arrange the processing device for implementing the method on site. Likewise, an arrangement at a different site is also possible. An implementation in a cloud is even possible.

In many cases, the output product of the raw materials industry plant for its part serves as input product for another raw materials industry plant. For example, initially (liquid) iron is produced. Then the iron is converted into (liquid) steel. Then the (liquid) steel is subjected to a treatment process, then the (liquid) steel is cast, then the solidified steel strand is hot-rolled and finally the hot-rolled steel strand is cold-rolled. Each of these process steps takes place in a respective raw materials industry plant, for example, a blast furnace, a converter, a vacuum treatment plant, a strand casting plant, a hot rolling mill, and a cold rolling mill.

Preferably, by reference to the state of one of the output products produced by the raw materials industry plant for a further raw materials industry plant to which the output product produced is fed as input product and which therefore produces a further processed product, the quality determination system determines bounds for the treatment of this output product in the further raw materials industry plant and specifies the bounds to an automation system or a production planning system for the further raw materials industry plant. A specification to the automation system for the further raw materials industry plant is in particular meaningful when the production planning system determines the production planning data comprehensively both for the raw materials industry plant and also for the further raw materials industry plant.

For example, in the process explained above, the chemical composition of the steel after production from iron can be used to determine the quantities of additives, which must be supplied to the steel in the following treatment process so that the steel has specific properties. Also for example, when a specific profile and a specific planeness of the rolled strip are established after the hot rolling, limits of process variables for the subsequent cold rolling process can be determined so that the cold-rolled strip does not undulate.

In one embodiment of this procedure, it is in particular possible that the quality determination system checks by reference to the state of one of the output products produced by the raw materials industry plant whether this output product maintains predefined quality parameters for this output product. If the predefined quality parameters are maintained by this output product releases an already planned further processing of this output product by the further raw materials industry plant. But, if the predefined quality parameters are not maintained by this output product, this determines a modified further processing by the further raw materials industry plant in addition to the bounds for the treatment of this output product in the further raw materials industry plant taking into account the actual quality parameters of this output product.

The maintaining of predefined quality parameters can, for example, be necessary to produce a further output product within the framework of the planned further processing of this output product, which for its part maintains defined quality parameters. If the state of the respective output product allows the production of the predefined further output product, the bounds are determined accordingly by the quality determination system. If the state of the respective output product does not allow the production of the predefined further output product, it must first be determined whether and optionally which further output product can still be produced by the further (or another) raw materials industry plant. For this further product which can now be produced, the quality determination system then determines the relevant bounds for the processing by the further (or another) raw materials industry plant. This can, for example, be accompanied by the manufacture of a further output product with reduced quality requirements.

It is even possible that the output product which does not maintain the predefined quality parameters is fed to a different raw materials industry plant and that plant to which it is fed then maintaining the predefined quality parameters. Depending on the situation of the individual case, the predefined quality parameters can thereby still be maintained.

Preferably, the quality determination system transmits the modified further processing to the production planning system and the production planning system takes into account the modified further processing in the course of determining the production planning data. By this means, the determination of the production planning data can always be up-to-date.

As a result of the respective input product and the operating parameters of the raw materials industry plant, a certain result of the respective output product is expected. It is possible that this expected result is known to the quality determination system. For example, the result of a model calculation can be supplied to the quality determination system or the quality determination system itself can perform such a model calculation. On the other hand, an actual state of the respective output product produced by the raw materials industry plant can deviate from this expected state. Possible causes are errors in the model, unidentified malfunctions, unidentified disturbances and many others. Preferably, in the event of a deviation of the (actual) state of the respective output product from a predicted state, an analysis is made of the states of the components of the raw materials industry plant and/or of operating parameters of the raw materials industry plant. The analysis can in particular serve to find the cause of the deviation of the state from the predicted state.

Upon reaching limiting values by the previous or future predicted states of the components of the raw materials industry plant, the state monitoring system transmits corresponding messages to the maintenance planning system. In a preferred embodiment, the limiting values are determined taking into account the production planning data. As a result, the limiting values can be dynamic.

Preferably, the production planning system optimizes the production planning data with the aim of maximizing an operating time of the raw materials industry plant. As a result, the productivity of the raw materials industry plant can be maximized.

The object is further achieved by a system for planning production and/or maintenance of raw materials industry plants. According to the invention, a system for planning production and/or maintenance of raw materials industry plants of the type mentioned initially is modified in that the production planning system, the state monitoring system, the quality determination system, and the maintenance planning system are programmed in such a manner that they together execute a method according to the invention for planning production and/or maintenance of raw materials industry plants.

BRIEF DESCRIPTION OF THE DRAWINGS

The properties described above, features, and advantages of this invention as well as the manner in which these are achieved become more clearly and distinctly understandable in connection with the following description of the exemplary embodiments, which are explained in detail in conjunction with the drawings. In the drawings in schematic view.

DESCRIPTION OF THE EMBODIMENTS

Figure 1:
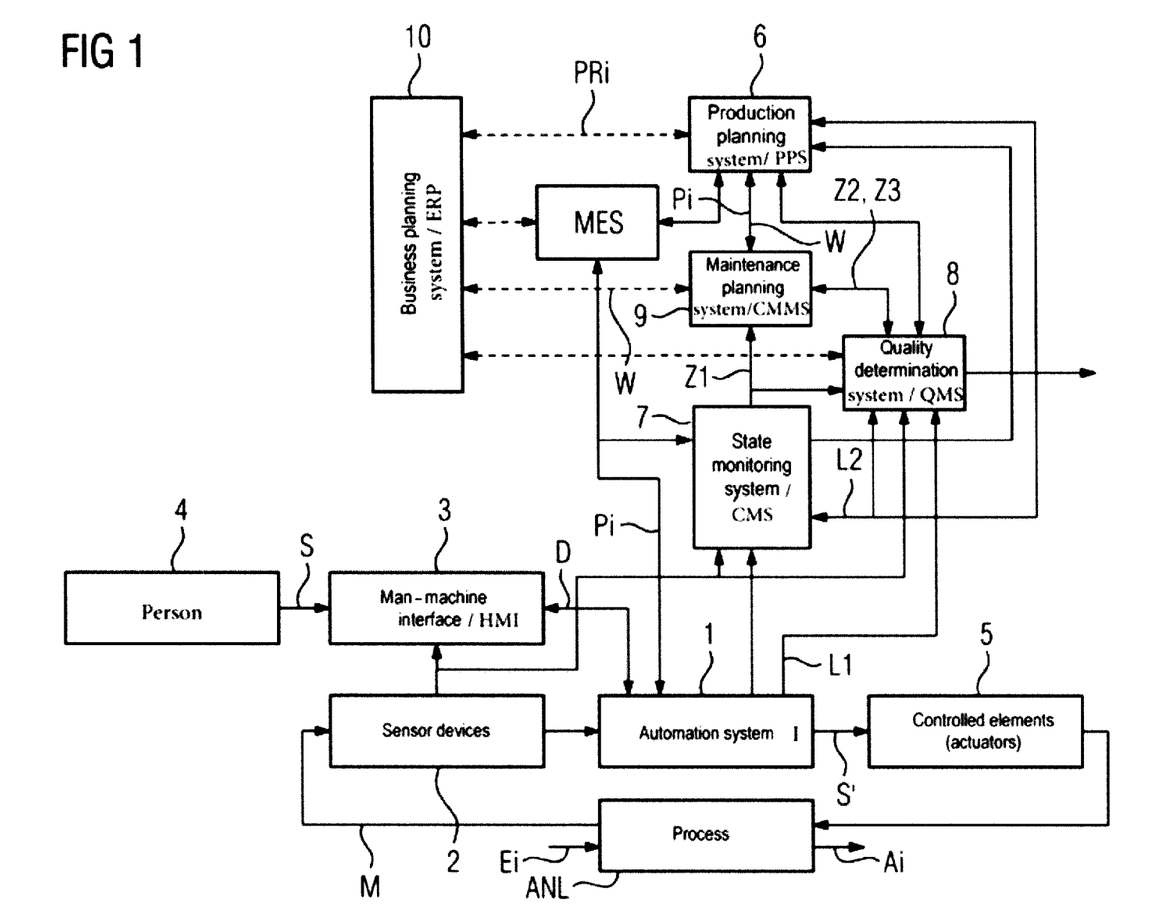
FIG. 1 shows an overall view of processing devices.

According to FIG. 1, a raw materials industry plant ANL comprises an automation system 1, sensor devices 2, and a man-machine interface 3. The automation system 1 can in this case inter alia also include a PDA system (PDA=Process Data Acquisition). A PDA system stores recorded process data in the sense of a history so that process data accumulated earlier can also be accessed subsequently. As a result, in particular, for example, within the framework of an error search, a determination of the basic cause can be made. Furthermore, as a result the previous time behaviors of all process variables are also available. The raw materials industry plant ANL can in principle be arbitrarily configured. Compare the above explanations. In particular, the raw materials industry plant ANL can be configured as a plant of the metal-producing industry. Compare also the above explanations.

The sensor devices 2 record measurement data M of the plant ANL. The measurement data M be individual values, for example, a singular temperature or a singular speed or a singular force.

Alternatively, this can comprise dimensional data, for example, a temporal temperature behavior or a local temperature distribution. Other variables may also come into consideration. The measurement data M recorded by means of the sensor devices 2 are supplied at least in part to the automation system 1, which receives the measurement data M supplied to it. The measurement data M recorded by the sensor devices 2 are furthermore transmitted at least partially to the man-machine interface 3. The man-machine interface 3 outputs the measurement data M transmitted to it to a person 4. The person may, for example, be an operator of the raw materials industry plant ANL, a fitter, a start-up engineer, or another person or may belong to the maintenance staff.

It is possible that all the measurement data M recorded by the sensor devices 2 are fed both to the automation system 1 and also to the man-machine interface 3. Usually, however, only a part of the measurement data M recorded by the sensor devices 2 are supplied both to the automation system 1 and also to the man-machine interface 3. Usually other measurement data M recorded by the sensor devices 2 are supplied exclusively to the automation system 1 but not to the man-machine interface 3. In the case of other measurement data M recorded by the sensor devices 2 again, this can be the opposite.

The man-machine interface 3 still receives data D from the automation system 1 and outputs it to the person 4. Furthermore, the man-machine interface 3 receives control commands S from the person 4. The received control commands S are relayed by the man-machine interface 3 to the automation system 1.

The automation system 1 determines further control commands S' by reference to the information available to it. The further control commands S' are output by the automation system 1 to controlled elements 5 (actuators 5) of the plant ANL. As a result, the raw materials industry plant ANL is controlled and/or monitored by the automation system 1. In the course of determining the further control commands S', the automation system 1 takes into account both the received measurement data M and also the control commands S predefined by the man-machine interface 3. In the course of determining the further control commands S', the automation system 1 frequently also takes into account internal data I, i.e. data which is only present inside the automation system 1. The internal data I are neither received from outside nor delivered to outside by the automation system 1 (in the course of the control process as such). This can, for example, comprise data which are determined by the automation system 1 assisted by models. This can also comprise data, which are merely co-calculated by the automation system 1 without forming models, for example, values of timers or flags.

The automation system 1 usually comprises several levels. Level 0 is formed by the sensors (i.e. the sensor devices 2) and the actuators (i.e. the actuators 5). Level 1 is the so-called base automation, which implements the control circuits. Level 2 contains the technological automation, which comprises the process models, and determines the target values for the control circuits.

The information by reference to which the automation system 1 determines the control data S' also comprises production planning data Pi, which are transmitted to the automation system 1 from a production planning system 6. The index i=1, 2, . . . etc. is used here and also with other variables to indicate that a plurality of corresponding variables is present. The production planning system 6 according to the diagram in FIG. 2 receives a plurality of data. The data comprise as most important data primary orders PRi. The primary orders PRi specify in each case which output product Ai or which output products Ai should be produced by the raw materials industry plant ANL. The primary orders furthermore specify by which date the corresponding primary order PRi must or should be processed. The production planning system 6 is furthermore aware—for example, as a result of a specification from outside, of which input product Ei or which input products Ei is or are available to produce the output products Ai. In the course of the specification to the production planning system, the input products Ei need not yet be assigned to the primary orders PRi (even if this is possible in principle). The primary orders PRi are an accumulation, i.e. they do not form any ordered sequence. The production planning system 6 determines the relevant production planning data Pi from the primary orders PRi. The production planning data Pi specify at which times the raw materials industry plant ANL should produce the respective output product Ai of the respective primary order PRi. The production planning system 6 thus brings the primary orders PRi into a corresponding sequence. The production planning system 6 can optimize the production planning data Pi in particular with the aim of maximizing an operating time of the raw materials industry plant.

Figure 2:
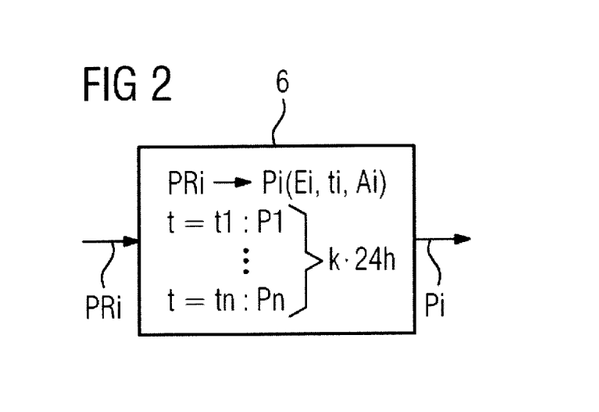
FIG. 2 shows a production planning system.

However, the production planning data Pi do not only form a sequence. On the contrary, the production planning data Pi also specify which input products Ei should be supplied to the raw materials industry plant ANL. They furthermore specify at which times ti the output products Ai should be produced by the raw materials industry plant ANL. If the raw materials industry plant ANL is a hot rolling mill for rolling metal strip, it is specified for example which slab (=input product) should be supplied to the hot rolling mill at which time and which final roll thickness the ready-rolled metal strip (=output product) should have. Furthermore, in the respective production planning data Pi, further details can be specified, in particular quality parameters, for example, profile and flatness as well as yield stress, yield limit, hardness, and so forth.

The production planning system 6 performs the determination of the production planning data Pi with a relatively large time horizon. The time horizon according to the diagram in FIG. 2 is at least several days, frequently even several weeks or months.

The operating mode of the production planning system 6 is known as such, see the already-mentioned prospectus "PSImetals Planning—Production Management Solutions for the Metals Industry" of PSI Metals GmbH.

Figure 3:
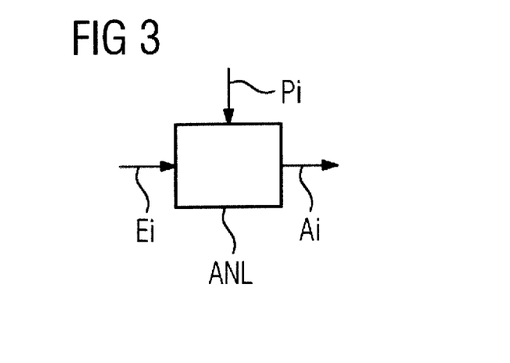
FIG. 3 shows a raw materials industry plant.

The production planning data Pi are transmitted individually or in groups by the production planning system 6 to the automation system 1 and thus specified to the automation system 1. The specification can be made directly or indirectly via a manufacturing execution system (MES). The production planning data Pi are executed by the automation system 1 according to the specified sequence. The raw materials industry plant ANL thus produces the respective output products Ai from the input products Ei of the respective production order Pi in the predefined sequence according to the diagram in FIG. 3. It is possible that a 1:1 relationship exists between the input products Ei and the output products Ai. However, it is also possible that several output products are produced from a single input product Ei or conversely several input products Ei go into one output product Ai. Generally an N:M relationship exists.

Furthermore, a state monitoring system 7 is provided. The state monitoring system 7 receives measurement data M and/or data derived from the measurement data M. The specification of the data can be made directly via the sensor devices 2 by the raw materials industry plant ANL. Alternatively a specification via the automation system 1 is possible. The state monitoring system 7 determines by reference to received data the previous states Z1 of components of the raw materials industry plant ANL. In order to determine the states Z1 of the components of the raw materials industry plant ANL, the state monitoring system 7 can, for example, use a physical model, an artificial intelligence (in particular a neural network), or a control-based system.

The states Z1 of the components of the raw materials industry plant ANL are suitably determined. For example, in the case that the raw materials industry plant ANL is configured as a rolling mill, according to the procedure of WO 2012/025 438 A1 for working rollers, the respective wear can be determined as a function of the so-called roller travel. Similar procedures are also possible in other raw materials industry plants for components thereof.

The term "previous states" is meant in the sense that the resulting state Z1 is determined for the instantaneous time point. As a result of the fact that this state Z1 not only depends on the instantaneous circumstances but also on the past of the components, the previous states Z1 must however also have been determined beforehand. However, it is not necessary that all previous states Z1 are still available in the sense of a history (even if this is possible). The previous states Z1 must however have been determined beforehand.

Furthermore, the state monitoring system 7 also determines future predicted states Z1 of the components of the raw materials industry plant ANL. In the course of this determination the state monitoring system 7 additionally uses production planning data Pi for the output products Ai to be produced as the next product or data derived from the corresponding production planning data Pi. In particular, based on these production data Pi assisted by models, the state monitoring system 7 can determine a predicted operating mode of the raw materials industry plant ANL and can determine the future predicted states Z1 by reference to the determined predicted operating mode. In this case, this prediction is not based on a statistical evaluation but specifically on the production planning data Pi for the output products Ai to be produced as the next product. This procedure is also explained in WO 2012/025 438 A1 for a rolling mill or for the working rollers of the rolling mill and their future wear as a function of the future roller travel. Similar procedures are also possible in other raw materials industry plants for components thereof. If the data supplied to the state monitoring system 7 are or comprise dimensional data, the state monitoring system 7 can, for example, comprise a processing device for processing the dimensional data supplied to it and in particular for determining the future predicted states Z1, which processing device processes the dimensional data by means of an artificial intelligence. Such a processing device is explained in the earlier, non-prior-published application having the internal file reference 201600233 of the applicant and the title "Use of comprehensive artificial intelligence in raw materials industry plants".

Furthermore a quality determination system 8 is provided. The quality determination system 8 is a system which is different from the automation system 1. It receives, similarly to the state monitoring system 7, measurement data M and/or data derived from the measurement data M. The specification of the data can be made directly via the sensor devices 2 by the plant ANL. Alternatively, a specification is possible via the automation system 1. The quality determination system 8 furthermore receives from the state monitoring system 7 the previous and the future predicted states Z1 of the components of the raw materials industry plant ANL. Finally, the quality determination system 8 receives the production planning data Pi. The specification can alternatively be made by the production planning system 6 or by the automation system 1.

The quality determination system 8 determines from the received data the states Z2 of the output products Ai produced by the raw materials industry plant ANL and the output products Ai to be produced. Furthermore, the quality determination system 8 determines from the received data past and future states Z3 of the raw materials industry plant ANL as a whole. If the raw materials industry plant ANL is a rolling mill, the quality determination system 8 can, by reference to the data available to it, determine as state Z2 for a specific output product Ai, for example, width and thickness as well as actual quality parameters such as, for example, profile and flatness as well as yield stress, yield limit, hardness, and so forth.

Furthermore, the quality determination system 8 can in the same case determine by reference to the data available to it as state Z3 of the raw materials industry plant ANL—i.e., as process state—a corresponding evaluation (e.g. good or bad, stable or unstable, efficient or inefficient, or corresponding intermediate stages). Likewise, in the case of a steel-producing plant (for example, a converter) as state Z2 the chemical composition and the temperature of the respective output product Ai (in this case a melt) can be determined or predicted. The state Z3 of the plant ANL can be determined in this case in a similar manner. Alternatively to a determination of the state Z3 of the raw materials industry plant ANL by the quality determination system 8, it is also possible that the state Z3 of the raw materials industry plant ANL is made available to the quality determination system 8 by the state monitoring system 7. As a result, the state Z3 of the raw materials industry plant ANL produces the relationship between the state of the raw materials industry plant ANL and the resulting product quality.

An example, here for a production line: if a fault occurs in a descaler of the production line, for example, a nozzle is blocked or the descaler is operated at varying pressure, this fault can result in too-little descaling of the hot strip and resulting surface defects in the hot strip. The operating state of the descaler is provided to the quality determination system 8 by the state monitoring system 7. The quality determination system 8 determines as state Z2 for the output product Ai the corresponding impairment of the quality. As state Z3 the quality determination system 8 can, for example, determine an instability (as a result of the varying pressure).

A further example, here for a continuous casting machine: if cooling devices of the continuous casting machine are defective, for example, nozzles are blocked or feed devices for feeding water to the nozzles are defective, this results in a nonuniform solidification of the cast metal strand and therefore nonuniform material properties. The state monitoring system 7 determines the corresponding defect. The quality determination system determines as state Z2, for example, the quality of the cast metal strand and as state Z3, for example, the quality of the operation and/or the extent for the risk of a mold rupture.

Furthermore, the states Z2 of the output products Ai to be produced can be determined as required. Some examples for this, without claiming to be complete, are now described:

In the course of the production of steel, the temperature, the chemical analysis, and the weight of the steel melt and buffer times can be determined as states Z2. The analysis can in particular contain the components of sulfur, phosphorus and carbon, oxygen and nitrogen in the steel.

In the course of the continuous casting, for example, the casting speed, the temperature and parameters of the cooling and solidification process can be determined as states Z2.

In the course of the rolling, for example, the forming rate, the temperature profile, the type of descaling, the final rolling temperature, the reel temperature, the speed profile of the metal strip etc. can be determined.

The structure and the operating mode of the quality determination system 8 are known, insofar as this relates to the determination of the states Z2 of the already produced output products Ai and the past states Z3 of the raw materials industry plant ANL. Purely as an example, reference can be made to the already mentioned scientific report "TPQC—Through Process Quality Control" by Gerhard Kurka and Gerald Hohenbichler. Insofar as the determination of the states Z2 for output products Ai still to be produced and of the future states Z3 of the raw materials industry plant ANL is concerned, this procedure can be used. In particular, similarly to the prediction for the states Z1 of the components of the raw materials industry plant ANL within the framework of the state monitoring system 7, based on the production data Pi for output products Ai still to be produced assisted by models, a predicted operating mode of the raw materials industry plant ANL can be determined and with reference to the operating mode thus determined, the states Z2 of the output products Ai to be produced by the raw materials industry plant ANL and the future predicted states Z3 of the raw materials industry plant ANL can be determined. The quality determination system 8 can, similarly to the state monitoring system 7, also comprise a processing device for processing the data supplied to it and also here in particular for determining future states Z3, as is explained in the application having the internal file reference 201600233 of the applicant.

Furthermore, a maintenance planning system 9 is provided. The maintenance planning system 9 receives the previous and the future predicted states Z1 of the components of the raw materials industry plant ANL from the state monitoring system 7. For example, in the case of a rolling mill as a raw materials industry plant ANL, the previous and the future predicted wear of the working rollers of the rolling stands of the rolling mill can be specified to the maintenance planning system 9 by the state monitoring system 7. Furthermore, the maintenance planning system 9 receives from the quality determination system 8 the states Z2 of the output products Ai produced by the raw materials industry plant ANL and of the output products Ai to be produced and/or past and future states Z3 of the raw materials industry plant ANL as a whole. Regardless of the type and manner of the specification, the required data are however available to the maintenance planning system 9 as early as possible for further processing.

The maintenance planning system 9 determines maintenance planning data W for the raw materials industry plant ANL taking into account these data. The maintenance planning data W initially comprise a (preferably chronological) listing of the maintenance measures to be taken. Furthermore, the maintenance planning data W comprise a listing of the items required for executing the maintenance. The list with measures is output to the person 4. The listing of the required items can be sent to a business planning system 10, by which this listing can be processed in an automated manner.

The operating mode of the maintenance planning system 9 as such, i.e., the determination of the maintenance planning data W, is known, for example, in the form of the MAXIMO system of the IBM Corporation or the PREDIX system of the General Electric Company. In the prior art, however, the maintenance planning data W is determined using data which had been determined once in advance by estimating and then retained statistically. Within the framework of the present invention, on the other hand, the current data of the state monitoring system 7 and of the quality determination system 8 are used to determine the maintenance planning data W.

Alternatively or additionally, it is possible that the production planning system 6 receives the previous and the future predicted states Z1 of the components of the raw materials industry plant ANL from the state monitoring system 7 and furthermore receives from the quality determination system 8 the states Z2 of the output products Ai produced by the raw materials industry plant ANL and of the output products Ai to be produced and/or past and future states Z3 of the raw materials industry plant ANL as a whole and takes these into account when determining the production planning data Pi. As a result, for example, the production planning can be updated by the production planning system 6 at any time, if as a result of the future predicted states Z1 of the components of the raw materials industry plant ANL, specific operating states of the raw materials industry plant ANL are no longer possible in order to produce a specific desired output product Ai. Similarly, the production planning system 6 can respond if, as a result of the future predicted states Z2 of the output products Ai to be produced, it can be predicted that the corresponding output products Ai can no longer maintain the required quality parameters.

FIG. 1 not only shows the base configuration of the relevant production and maintenance planning system explained above but at the same time shows a plurality of advantageous configurations. The configurations in this case can be achieved independently of one another. However, if required, they can also be combined with one another.

A first configuration consists in that the maintenance planning system 9 receives the production planning data Pi from the production planning system 6. In this case, it is possible that the maintenance planning system 9 takes into account the production planning data Pi when determining the maintenance planning data W. For example, the maintenance planning system 9 can specifically place maintenance measures in time intervals at which a production pause must be inserted as a result of the production planning. In particular, the maintenance planning system 9 can bring forward a maintenance measure if it can be predicted that without bringing forward the maintenance measure, at a later time point the maintenance measure would result in an undesired stop in production and by bringing forward the maintenance measure, the maintenance measure can be carried out during a stop in production provided in any case as a result of the production planning.

A second configuration consists in the inversion of this process. It therefore consists in the production planning system 6 receiving the maintenance planning data W from the maintenance planning system 9. In this case, it is possible that the production planning system 6 takes into account the maintenance planning data W when determining the production planning data Pi. For example, the production planning system 6 can bring forward or delay an individual production order Pi according to the time point for which the next maintenance is planned. If the production orders Pi require different times for their execution, the production planning system 6 can possibly group the production orders Pi such that a maintenance-dependent pause can begin after the shortest possible time after the end of execution of a production order Pi. The production planning system 6 can also start the next production order Pi directly after the end of the maintenance-dependent pause, i.e. as soon as possible.

A third configuration consists in that the quality determination system 8 determines limiting values L1 for dynamic settings and/or limiting values L2 for resulting states Z1 of the components of the raw materials industry plant ANL taking into account the production planning data Pi and/or the future predicted states Z1 of the components of the raw materials industry plant ANL. Settings of the components are in this connection states, which can be actively set by actuating corresponding actuators 5, for example, a rolling force, a rotational speed, a moment, a temperature, and so forth. States Z1 on the other hand are results, which are undesirably established during operation of the corresponding components, for example, a wear.

The quality determination system 8 specifies in the case of the third configuration the limiting values L1 for the dynamic settings to the automation system 1 and/or the limiting values L2 for the resulting states Z1 to the state monitoring system 7 as limiting values to be maintained. The limiting values L1, L2 can in particular be determined by the fact that they must be maintained so that predetermined quality standards are maintained for the output products Ai to be produced. For example, in the case of a rolling mill, a maximum bend back of the working rollers of a rolling stand or a maximum contour fluctuation over the width of the working rollers can be predefined as limiting value L1 for a dynamic setting so that profile and flatness values are maintained. Likewise, in the same case, a maximum wear of the working rollers of a rolling stand can be specified to the state monitoring system 7 as limiting value L2 to be maintained so that the profile and flatness values are maintained. Also, a specific temperature range for the rolling material to be rolled can be specified, for example, as limiting value L1 or L2, so that the rolling mill can reach required degrees of forming. Also a specific minimum or maximum temperature gradient in a cooling section downstream of the rolling mill can be predefined as limiting value L1 or L2 so that required mechanical properties of the rolling material are maintained.

A fourth configuration consists in that the maintenance planning system 9 sends the maintenance planning data W to the quality determination system 8. In this case, when determining the limiting values L1 for the dynamic settings and/or the limiting values L2 for the resulting states Z1, the quality determination system 8 can also take into account the maintenance planning data W. For example, in the case of a rolling mill with freshly changed working rollers (wear almost 0), a higher bend back can be allowed than in the case of working rollers that are already partially worn.

Figure 4:
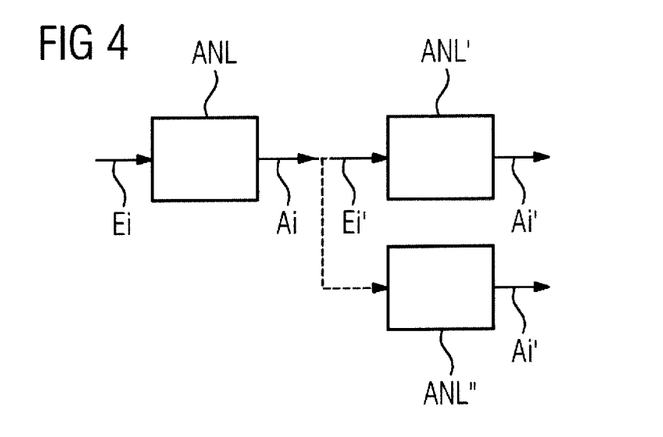
FIG. 4 shows a group of raw materials industry plants.

In many cases, according to the diagram in FIG. 4, the output product Ai produced by the raw materials industry plant ANL is for its part in turn an input product Ei' for a further raw materials industry plant ANL', which thus produces a further processed product Ai'. In this case, a fifth configuration can consist in that by reference to the state of one of the output products Ai produced by the raw materials industry plant ANL for the further raw materials industry plant ANL', the quality determination system 8 determines bounds for the treatment of this output product Ai in the further raw materials industry plant ANL' and specifies the bounds to an automation system 1' or a production planning system 6' for the further raw materials industry plant ANL'. For example, by reference to the final temperature of a steel melt produced in an oxygen blast furnace after the decarbonization, it can be decided in which way the steel melt should be further processed in a subsequent ladle process.

The spirit and purpose of the quality determination system 8 is, inter alia, that the quality determination system 8 checks by reference to the state Z2 of one of the output products Ai produced by the raw materials industry plant ANL whether this output product Ai maintains quality parameters, which are predefined for this output product Ai. For example, in the case of a steel melt, the quality determination system 8 can check the chemical composition thereof and the temperature thereof. Based on this check, if the predefined quality parameters are maintained by this output product Ai, the quality determination system 8 releases an already planned further processing of this output product Ai by the further raw materials industry plant ANL'. Within the framework of the present invention, a sixth configuration based on the fifth configuration can consist in that if the predefined quality parameters are not maintained by this output product Ai, the quality determination system 8 determines, in addition to the bounds for the treatment of this output product Ai in the further raw materials industry plant ANL' taking into account the actual quality parameters of this output product Ai, a modified further processing by the further raw materials industry plant ANL'. For example, a modified further processing can be determined for which the quality requirements of the further output product Ai' are reduced. In the individual case, if the quality requirements are fulfilled in a particularly excellent manner, even the inverse procedure is possible, that the quality requirements are raised, that therefore contrary to expectation, even a higher-quality further output product Ai' than originally planned can be produced. Furthermore, it is possible that the processing as such is modified, for example, in the case of rolling, a product having a reduced profile accuracy is produced. In the case of steel production, a different modification can consist in producing a different type of steel. It can also mean carrying out a further treatment or an additional treatment so that the output product Ai can still satisfy the quality requirements. For example, if the output product Ai is a steel melt, a modified metallurgical treatment can be accomplished in a ladle process so that the steel melt still has the required quality at the end of the ladle process. Also, for example, in an oxygen blast furnace, after the decarbonization, it can be decided to carry out another post-blasting process in order to still reach a desired quality. According to the diagram in FIG. 4, it can also mean that the output product Ai is processed in a different raw materials industry plant ANL"— i.e. a raw materials industry plant different from the further raw materials industry plant ANL'—than originally planned.

In an addition to this configuration, the quality determination system 8 sends the modified further processing to the production planning system 6. As a result, the production planning system 6 can take into account the modified further processing in the course of determining the production planning data Pi. In particular, the production planning system 6 can take account of the fact that the actually desired output product Ai could not be produced and therefore must be produced again. The corresponding amendments can be made by the production planning system 6.

As already mentioned, not only data from the automation system 1 and/or from the sensor devices 2 but also from the state monitoring system 7 are supplied to the quality determination system 8. It is thereby possible that in the event of a deviation of the state Z2 of one of the output products Ai produced by the raw materials industry plant ANL from a predicted state Z2, the quality determination system 8 according to a seventh configuration performs an analysis of the states Z1 of the components of the raw materials industry plant ANL and/or of operating parameters of the raw materials industry plant ANL. The analysis is used to find the cause for the deviation of the state Z2 from the predicted state Z2. In order to implement such a capability, the quality determination system 8 can, for example, have a neural network, in particular a deep neural network (DNN=deep neural network) or a folding neural network (CNN=convolutional neural network). The corresponding types of network are generally known to persons skilled in the art.

In an eighth configuration, it is possible that upon reaching limiting values L1 by the previous or future predicted states Z1 of the components of the raw materials industry plant ANL, the state monitoring system 7 sends corresponding messages to the maintenance planning system 9. This is in contrast to the procedure of the prior art in which a transmission is only made to the person 4 and the person 4 himself must perform corresponding inputs in the maintenance planning system 9. Furthermore, it is possible that the limiting values L1 are determined taking into account the production planning data Pi.

The determination can be performed, in particular, by the quality determination system 8. Possibly, an independent determination by the state monitoring system 7 is also possible.

The raw materials industry plant ANL is usually operated in the course of the production of a respective output product Ai during a respective time interval of a maximum of a few hours. The production planning and the maintenance planning on the other hand have significantly larger time horizons. On the other hand, the production planning system 6 and the maintenance planning system 9 only require for a respective determination of the production planning data Pi or the maintenance data W a processing time which varies in the range of a few hours, for example, a maximum of two hours. Furthermore, by far the most data which the various systems 6 to 9 require is currently available at any time. The processings, links, and optimizations based on this can therefore also be carried out at any time. It is therefore possible to carry out the method for planning of production and/or maintenance of raw materials industry plants ANL in an automated iterative manner. As a result, relative to the cycle times of the raw materials industry plant ANL—the production planning data Pi and/or the maintenance data can be provided quasi in real time. In this case, it is alternatively possible that the method for planning of production and/or maintenance is executed continuously or on request by the person 4.

The essence of the present invention therefore consists in that the various IT systems 1 and 6 to 9 shown in FIG. 1, which are used in connection with the raw materials industry plant ANL and which hitherto are only linked to one another to a small extent or form isolated solutions, are connected, linked, and coupled to one another. The necessary interfaces for linking the systems 1 and 6 to 9 to one another can readily be created. As a result of the linking, it is possible to make a holistic examination of the operation of the raw materials industry plant ANL.

It is possible that the various systems 6 to 9 are arranged in the immediate proximity or at least in the proximity of the raw materials industry plant ANL. However, they can also be arranged (completely or partially) at a different location. Only the automation system 1 should be on site. A distributed or non-localized arrangement—for example, in a cloud—is also possible. Outputs can be implemented as required also as smart devices or apps.

The method according to the invention can alternatively take place semi-automatically or fully automatically. In the case of a semi-automatic sequence, the various systems 6 to 9 perform their determinations and output the results of their determinations to the person 4. The person 4 is then able to confirm the results and thereby release or however, in the individual case, to refuse the release. In the case of the fully automatic sequence, the various systems 6 to 9 can certainly also output the results of their determinations to the person 4. However, this is no longer compulsory since no further release is requested but the results are immediately switched actively. However, in fully automatic operation the person 4 still has the possibility to intervene by means of a so-called override.

The various systems 6 to 9 can be independent processing devices. They can also be combined in a common processing system. They can possibly even run inside the automation system 1. The functionalities explained above are crucial but the implementation in specific processing devices is not.

The present invention has many advantages. In particular, a holistic examination is made. Furthermore, mutual dependences are taken into account. This results in an improved prediction accuracy and an improved determination of the remaining operating time of components of the raw materials industry plant ANL. Also the determination of the various data by the various systems 6 to 9 is current at any time. The relevant systems 6 to 9 can not only be implemented in new plants but can also be retrofitted in the course of modernizations. The degree of automation in production planning and maintenance planning can be increased considerably. Nevertheless, the person 4 can still make a correcting intervention if required. This results in an improved planning accuracy and an increased robustness in the event of faults. The operation of the raw materials industry plant ANL still remains safe if the person 4 has relatively little experience. Many operations are avoided. Artificial intelligences can be implemented in the various systems 6 to 9. This opens up a further potential for improvement.

REFERENCE LIST

1 Automation system
2 Sensor devices
3 Man-machine interface
4 Person
5 Controlled elements (actuators)
6 Production planning system
7 State monitoring system
8 Quality determination system
9 Maintenance planning system
10 Business planning system
Ai, Ai' Output products
ANL, ANL', ANL" Raw materials industry plants
D Data
Ei, Ei' Input products
I Internal data
L1, L2 Limiting values
M Measurement data
Pi Production planning data
PRi Primary orders
S, S' Control commands
W Maintenance planning data
Z1, Z2, Z3 States

The invention claimed is:

1. A method for planning production and/or maintenance of a raw materials industry plant (ANL), the method comprising:

controlling the raw materials industry plant (ANL) by an automation system and executing a sequence of production orders under control by the automation system, producing, by the raw materials industry plant (ANL), a number of output products (Ai) from a number of input products (Ei) per production order;

using a production planning system with a time horizon of at least several days, for determining future production planning data (Pi), specifying by the production planning system at which times selected input products (Ei) should be fed to the raw materials industry plant (ANL), which output products (Ai) should be produced by the raw materials industry plant (ANL) from the input products (Ei), and at which times the output products (Ai) should be produced by the raw materials industry plant (ANL);

specifying by the production planning system the future production planning data (Pi) to the automation system;

receiving by a state monitoring system from the automation system and/or via sensor devices directly from the raw materials industry plant (ANL) measurement data (M) and/or data derived from the measurement data (M);

determining from the measurement data (M) and/or data derived from the measurement data (M) previous states (Z1) of components of the raw materials industry plant (ANL) and furthermore, with additional utilizing of the future production planning data (Pi) or data derived from the future production planning data (Pi) determining future predicted states (Z1) of the components of the raw materials industry plant (ANL);

receiving by a quality determination system different from the automation system the measurement data (M) and/or data derived from the measurement data (M) from the automation system and/or via the sensor devices directly from the raw materials industry plant (ANL);

receiving by the quality determination system the previous and the future predicted states (Z1) of the components of the raw materials industry plant (ANL) from the state monitoring system and receiving the future production planning data (Pi) from the production planning system, and based on the foregoing, determining by the quality determination system states (Z2) of the output products (Ai) produced by the raw materials industry plant (ANL) and of the output products (Ai) to be produced, and/or determining by the quality determination system past and future states (Z3) of the raw materials industry plant (ANL) as a whole; and receiving, by a maintenance planning system, the previous and the future predicted states (Z1) of the components of the raw materials industry plant (ANL) from the state monitoring system and receiving the states (Z2) of the output products (Ai) produced by the raw materials industry plant (ANL) and the states of the output products (Ai) to be produced from the quality determination system and/or the past and future states (Z3) of the raw materials industry plant (ANL) as a whole;

taking into account these data, determining maintenance planning data (W) for the raw materials industry plant (ANL) and/or receiving by the production planning system the previous and the future predicted states (Z1) of the components of the raw materials industry plant (ANL) from the state monitoring system and receiving from the quality determination system the states (Z2) of the output products (Ai) produced by the raw materials industry plant (ANL) and the output products (Ai) to be produced and/or past and future states (Z3) of the raw materials industry plant (ANL) as a whole, and taking this into account when determining the future production planning data (Pi); and wherein the future production planning data (Pi) determines limiting values to make the raw materials industry plant (ANL) to produce qualified the number of output products (Ai) based also on the maintenance planning data (W).

2. The method as claimed in claim 1, further comprising:

receiving by the maintenance planning system the future production planning data (Pi) from the production planning system and, taking the future production planning data (Pi) into account when determining the maintenance planning data (W) and/or the production planning system, receiving the maintenance planning data (W) from the maintenance planning system and taking the maintenance planning data (W) into account when determining the future production planning data (Pi).

3. The method as claimed in claim 1, further comprising:

taking into account by the quality determination system the future production planning data (Pi) and/or the future predicted states (Z1) of the components of the raw materials industry plant (ANL), and determining limiting values (L1) for dynamic settings and/or limiting values (L2) for resulting states (Z1) of the components of the raw materials industry plant (ANL); and specifying by the quality determination system the limiting values (L1) for the dynamic settings to the automation system and/or the limiting values (L2) for the resulting states (Z1) to the state monitoring system as the limiting values to be maintained.

4. The method as claimed in claim 3, further comprising:

transmitting, by the maintenance planning system, the maintenance planning data (W) to the quality determination system, and also taking into account, by the quality determination system, the maintenance planning data (W) when determining the limiting values (L1) for the dynamic settings and/or the limiting values (L2) for the resulting states (Z1).

5. The method as claimed in claim 1, further comprising executing the method for the planning of production and/or maintenance of the raw materials industry plant (ANL) in an automated iterative manner.

6. The method as claimed in claim 5, executing the method for the planning of production and/or maintenance continuously or executing that method upon request by a person.

7. The method as claimed in claim 1, further comprising:

referring to the state (Z2) of one of the output products (Ai) produced by the raw materials industry plant (ANL), determining by the quality determination system for a further raw materials industry plant (ANL') to which the produced output product (Ai) is fed as input product (Ei'), thus producing a further processed product (Ai'), determining bounds for the treatment of this output product (Ai) in the further raw materials industry plant (ANL') and specifying the bounds to an automation system or a production planning system for the further raw materials industry plant (ANL').

8. The method as claimed in claim 7, further comprising:

using the quality determination system:

for checking, by reference to the state (Z2) of one of the output products (Ai) produced by the raw materials industry plant (ANL), whether this output product (Ai) maintains predefined quality parameters for this output product (Ai);

in response to the predefined quality parameters are maintained by this output product (Ai) releasing an already planned further processing of this output product (Ai) by the further raw materials industry plant (ANL'); and in response to the predefined quality parameters are not maintained by this output product (Ai), determining a modified further processing by the further raw materials industry plant (ANL') in addition to the determining of the bounds for the treatment of this output product (Ai) in the further raw materials industry plant (ANL'), taking into account the actual quality parameters of this output product (Ai).

9. The method as claimed in claim 8, further comprising:

transmitting by the quality determination system the modified further processing to the production planning system and taking into account the modified further processing, in the course of determining the future production planning data (Pi) by the production planning system.

10. The method as claimed in claim 1, further comprising:

in the event of a deviation of the state (Z2) of one of the output products (Ai) produced by the raw materials industry plant (ANL) from a predicted state, performing by the quality determination system an analysis of the states (Z1) of the components of the raw materials industry plant (ANL) and/or of operating parameters of the raw materials industry plant (ANL) with a view to finding the causes for the deviation of the state (Z2) from the predicted state.

11. The method as claimed in claim 1, further comprising:

upon reaching limiting values (L2) by the previous or future predicted states (Z1) of the components of the raw materials industry plant (ANL), transmitting, by the state monitoring system, corresponding messages to the maintenance planning system and determining the limiting values (L2) taking into account the future production planning data (Pi).

12. The method as claimed in claim 1, further comprising optimizing the future production planning data (Pi) by the production planning system with the aim of maximizing an operating time of the raw materials industry plant (ANL).

13. A system for planning production and/or maintenance of a raw materials industry plant (ANL), comprising:

an automation system, wherein the raw materials industry plant (ANL) is controlled by the automation system and executes a sequence of production orders under control by the automation system, such that the raw materials industry plant (ANL) produces a number of output products (Ai) from a number of input products (Ei) per production order;

a production planning system that produces future production planning data (Pi), a state monitoring system, a quality determination system, which is different from the automation system, and a maintenance planning system; and wherein the state monitoring system determines from measurement data (M) and/or data derived from the measurement data (M) previous states (Z1) of components of the raw materials industry plant (ANL) and furthermore, with additional utilizing of the future production planning data (Pi) or data derived from the future production planning data (Pi) determines future predicted states (Z1) of the components of the raw materials industry plant (ANL);

wherein the quality determination system determines the states (Z2) of the output products (Ai) produced by the raw materials industry plant (ANL) and the output products (Ai) to be produced by the raw materials industry plant (ANL);

wherein the production planning system, the state monitoring system, the quality determination system, and the maintenance planning system are programmed such that they jointly execute a method for the planning of production and/or maintenance of the raw materials industry plant (ANL);

wherein the quality determination system receives previous and future predicted states (Z1) of the components of the raw materials industry plant (ANL) from the state monitoring system and receives the future production planning data (Pi) from the production planning system, and based on the foregoing, determines the states (Z2) of the output products (Ai) produced by the raw materials industry plant (ANL) and of the output products (Ai) to be produced, and/or determines past and future states (Z3) of the raw materials industry plant (ANL) as a whole;

wherein the maintenance planning system determines maintenance planning data (W) for the raw materials industry plant (ANL) based on the previous and the future predicted states (Z1) of the components of the raw materials industry plant (ANL) from the state monitoring system and the states (Z2) of the output products (Ai) produced by the raw materials industry plant (ANL) and the states of the output products (Ai) to be produced from the quality determination system and/or the past and future states (Z3) of the raw materials industry plant (ANL) as a whole;

wherein the production planning system produces the future production planning data (Pi) based on the previous and the future predicted states (Z1) of the components of the raw materials industry plant (ANL) from the state monitoring system and the states (Z2) of the output products (Ai) produced by the raw materials industry plant (ANL) and the output products (Ai) to be produced and/or past and future states (Z3) of the raw materials industry plant (ANL) as a whole; and wherein the future production planning data (Pi) determines limiting values to make the raw materials industry plant (ANL) to produce qualified the number of output products (Ai) based also on the maintenance planning data (W).

* * * * *